Feb. 25, 1936.  S. B. HENDRICKS ET AL  2,031,650
LISTER PLANTER
Filed April 20, 1934  3 Sheets-Sheet 1
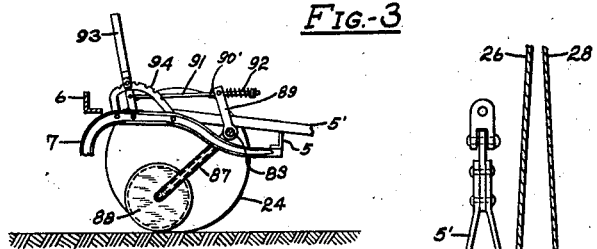
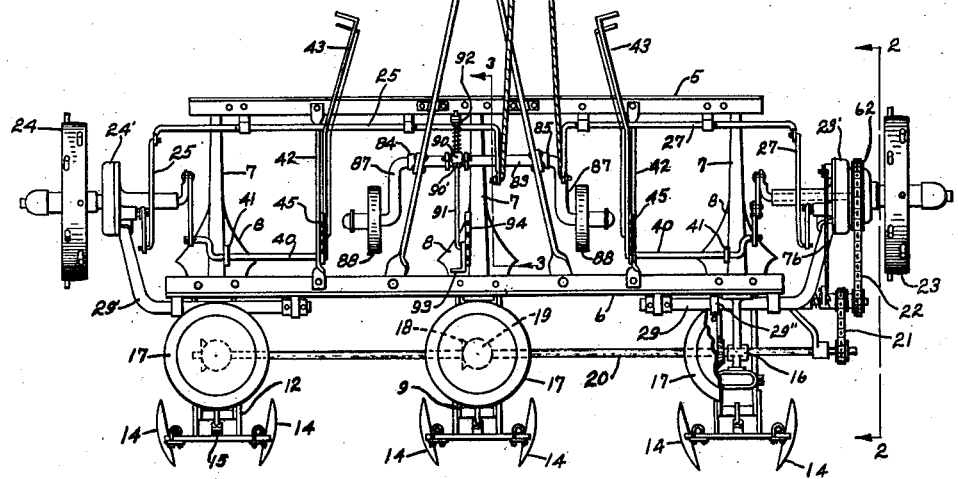
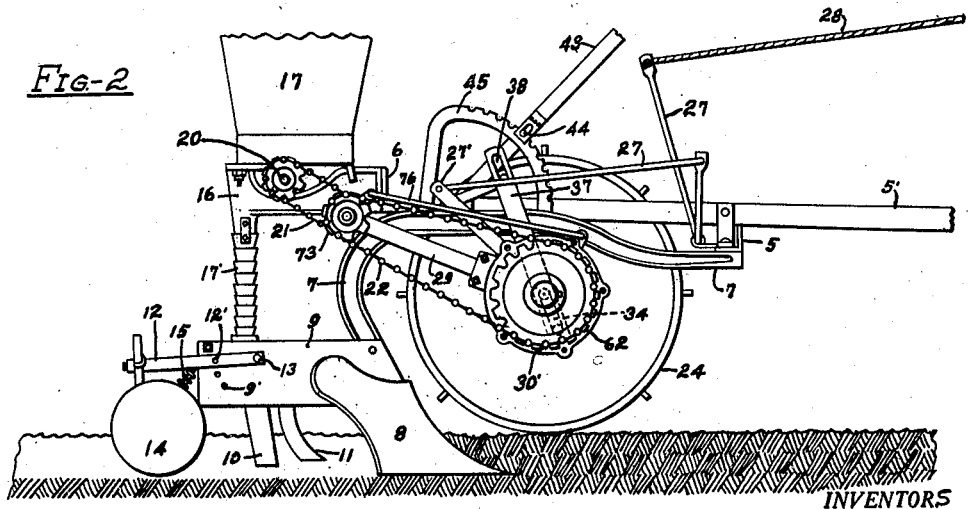
INVENTORS
SIMEON B. HENDRICKS
BY JOHN M. MARKEL
James a Walsh
ATTORNEY Feb. 25, 1936. S. B. HENDRICKS ET AL 2,031,650
LISTER PLANTER
Filed April 20, 1934 3 Sheets-Sheet 2
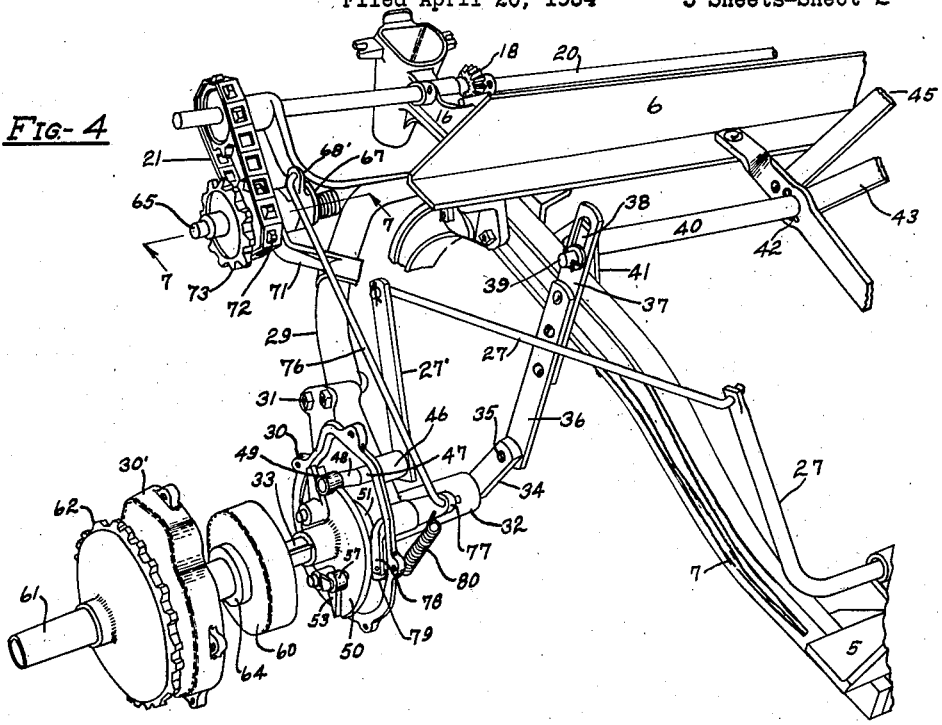
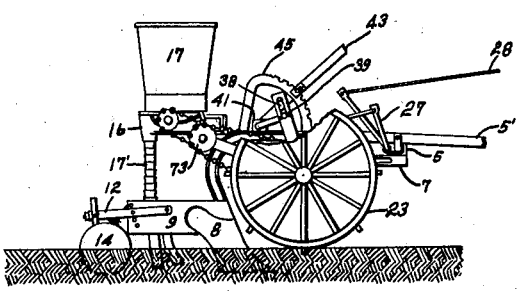
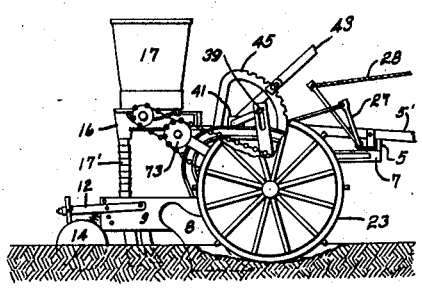
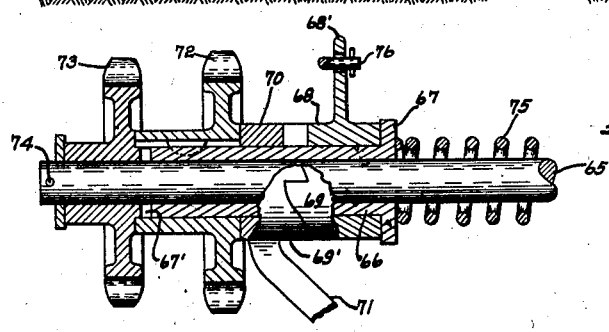
INVENTORS
SIMEON B. HENDRICKS
BY JOHN M. MARKEL
James A. Walsh
ATTORNEY

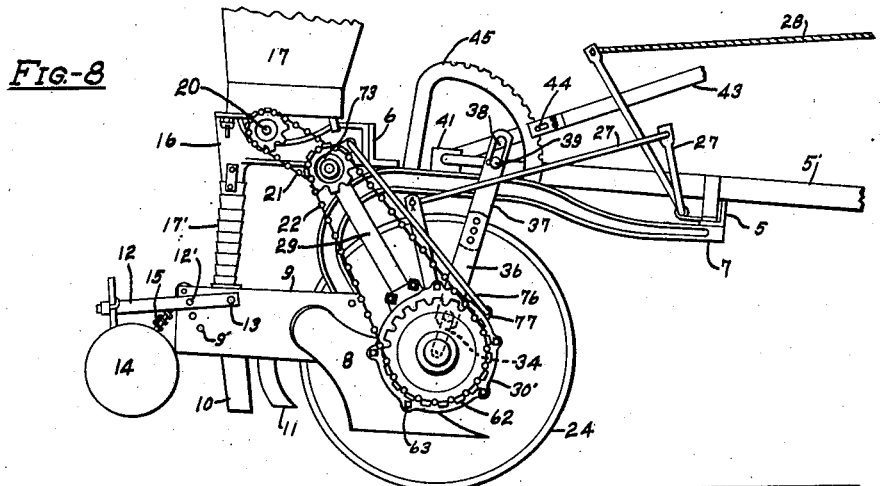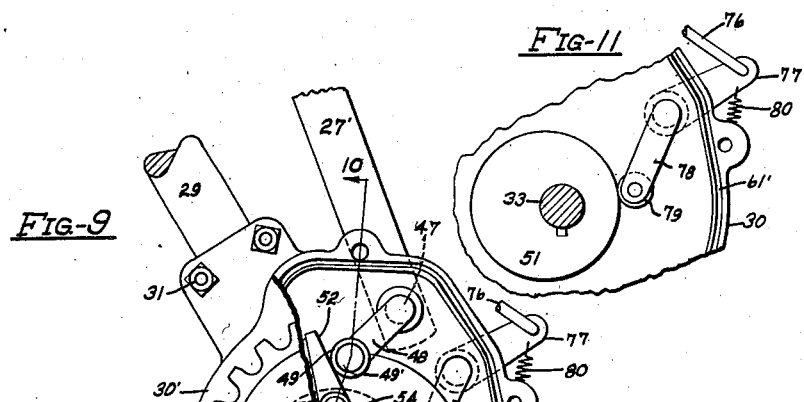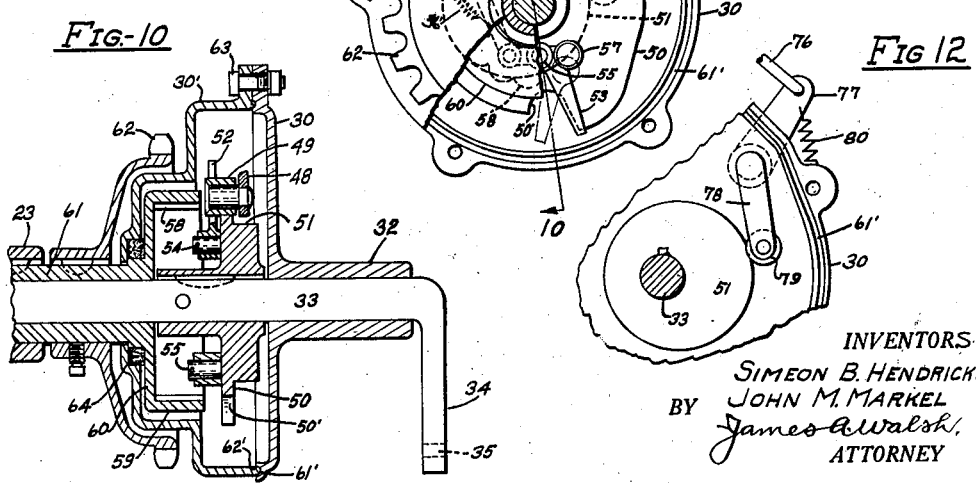

Patented Feb. 25, 1936

2,031,650

UNITED STATES PATENT OFFICE 2,031,650

LISTER-PLANTER

Simeon B. Hendricks and John M. Markel, Rockford, Ill., assignor to J. I. Case Company, Racine, Wis., a corporation Application April 20, 1934, Serial No. 721,511

5 Claims. (Cl. 111—68)

Our invention relates to an improved combination lister-planter adapted to be drawn by a tractor for listing plowed land and at the same operation planting seed in the prepared hills so that considerable time is saved as well as labor in performing the two operations during one movement of the machinery through the field, which commonly requires at least two implements, each of which performs its own service, and therefore, increased expense of labor, fuel and otherwise occurs. Said improvements include means for automatically clutching or declutching the drive shaft for the seeder mechanism when the plow parts are either in operative or inoperative condition, and which means are so arranged that no manual adjustment is required when the plow bottoms are operated in different depths; also, means are provided whereby the main drive wheel which operates the seeder actuating mechanism will have constant traction when the implement traverses extremely rough or furrowed fields; also, a plow clutch entirely closed and operating in oil; and further improvements in the detail construction and operation of such an implement will be apparent from the following disclosure:

In the accompanying drawings, forming part hereof, Figure 1 is a plan view of an implement embodying our improvements; Fig. 2, a side elevation as seen when looking in the direction of the arrows 2—2 in Fig. 1; Fig. 3, a detail section taken on the dotted lines 3—3 in Fig. 1; Fig. 4, a perspective as seen from the front of the implement when looking toward the left side thereof showing various elements employed in partly disassembled position, the wheel being omitted; Figs. 5 and 6, side elevations showing the improved linkage arrangement for the master or bull wheel; Fig. 7 an enlarged sectional detail on the dotted line 7—7 in Fig. 4 showing the construction of the seeder shaft clutch; Fig. 8, a side elevation taken on the dotted line 2—2 in Fig. 1 showing the plows in non-operating or transport position; Fig. 9, an enlarged fragmentary sectional view of an intermittent clutch and cam mechanism employed with the master wheel; Fig. 10, a detail sectional view on the dotted line 10—10 in Fig. 9 showing the relative position of elements forming part of the clutch shown in Fig. 9; and Figs. 11 and 12 are fragmentary details of the cam and linkage when the plows are in inoperative and operative positions respectively as indicated in Figs. 8 and 2.

In said drawings the numerals 5, 6, indicate the frame members of the lister, to the undersides of which we secure beams 7, each of which carries a plow 8, and extending rearwardly from the beams are brackets 9 supporting planting devices 10, 11. At the rear end of each bracket 9 an arm 12 is mounted, at 13, for supporting a pair of conventional covering disks 14, constantly urged into the ground by a spring 15 connected at its upper end to bracket 9, as shown in Fig. 2. A drawbar 5', as usual, is supported by the frame 5, 6, and which extends forwardly of the implement, its outer end provided with means for attachment to a tractor. Also extending rearwardly from frame member 6 are brackets 16 for supporting seed hoppers 17 having conduits 17' leading to the distributor 10, the usual rotary mechanisms in which hoppers are actuated by gears 18, 19, Fig. 1, through the shaft 20, chain system 21, 22, and master drive wheel 23, the construction and operation of all of which mechanisms are well known in the art.

Each carrying wheel 23, 24 respectively, operates in conjunction with an intermittent clutch 23' and 24' of well known construction, adapted for use with plows, clutch 24' being controlled by a linkage 25 and rope 26 connected thereto, and clutch 23' is likewise controlled by a similar linkage 27 and rope 28, which ropes, Fig. 1, are within convenient reach of an operator on the tractor (not shown) who may actuate either clutch independently or simultaneously by pulling on the appropriate rope or ropes as desired. Said clutches and wheels are mounted on crank axles 29, 29', pivotally secured in suitable supports, Fig. 1, on the rear frame member 6, the axle 29 preferably in the form of a collar having a forward projection thereon having a stop 29" adapted to contact frame 6 as axle 29 is turning for limiting the distance which wheel 23 may move in a downward direction.

Clutch 23' includes a housing member 30 attached to axle 29 by clamp bolts 31, Fig. 4, or otherwise, said housing member having a bearing 32 in which a clutch-shaft 33 is journalled and terminates in a crank 34 at its inner end connected at 35 to an adjustable link comprising members 36, 37, as shown in Fig. 4, the member 37 embodying a slot 38 in which the end 39 of an adjusting bell-crank 40 is mounted. Said bell crank is journalled in a suitable bracket 41 on beam 7 and also in the brace 42. The inner end of said bell crank 40 is connected to a lever 43 including the usual detent pin 44 and notched quadrant 45, Figs. 1, 2, and 8. At the upper part of housing 30 a bearing 46 is provided in which is journalled a stub-shaft 47 having an arm 48 supoprting a roller 49 for controlling the clutch mechanism, said stub-shaft being connected to the linkage 27 by an arm 27' and controlled by the rope 28 as stated.

A clutch plate 50, including a cam 51, preferably integrally formed therewith, is secured to clutch-shaft 33 as shown in Fig. 10, upon the face of which plate fingers 52, 53, are pivotally mounted as shown at 54, 55, Fig. 9, said fingers being connected by a link 56 having a spring 56' attached thereto and to cam 51, which spring causes roller 57 to move into engagement with notches 58 when the roller 49 is removed from the path of finger 52. The clutch engaging roller 57 is mounted on finger 53 for engaging notches 58 on the inner side of flange 59 of the drum 60 which drum has a hub 61 extending outwardly to form a shaft for a sprocket 62 and drive wheel 23, said three units 23, 62, and 59 as a whole rotating about clutch-shaft 33. In order to form a housing for containing lubricant and to also exclude foreign matter from the clutch and cam mechanisms we provide the member 30 preferably embodying a groove 61' which registers with a ring 62' in housing member 30', the two housing members being secured by bolts 63, and an oil seal 64 being inserted between housing member 30' and hub 61 as is commonly employed for such purpose.

The seeder drive mechanism is controlled by a clutch comprising in part a shaft 65, Figs. 4 and 7, on which shaft is mounted a sleeve 66 having a flanged head 67 and at its opposite end clutch teeth 67' of any desired shape, and upon said sleeve is a clutch throwout 68, one end of which bears against the flange 67 and its opposite cam end 69 engaging cam teeth 69' forming part of bearing 70 secured to crank axle 29 by a bracket, as 71. A sprocket 72 is loosely keyed to sleeve 66 and retained in position by abutting bearing 70 and hub of sprocket 73, which latter is idly mounted on shaft 65 and embodies integrally formed clutch teeth engaging the clutch teeth 67' of sleeve 66, said sprocket 73 being held on shaft 65 by a washer and a pin 74 or otherwise as desired, as indicated in Fig. 7. The sleeve member 66 is constantly urged toward sprocket 73 by a spring 75, as will further appear. The clutch throwout 68 includes an arm 68' to which a link 76 is attached and at its lower end is connected to a lever 77 forming part of arm 78 having a cam roller 79 at its end, which roller is held in contact with cam 51 by a spring 80 attached to housing 30 and the lever 77, as indicated in Fig. 4.

The general arrangement of clutch 24', wheel 24 and associated parts is the same as the opposite clutch and wheel except that no cam or chain drive mechanisms are associated therewith, and therefore specific description of these parts is deemed unnecessary.

In some operating conditions a center truck is employed in connection with the lister implement, as indicated in Fig. 1, the present truck comprising a transverse shaft 83 supported in bearings 84, 85, on the members of drawbar 5' the ends of which shaft terminate in crank axles 87 for supporting truck wheels 88. Approximately at the middle of the transverse portion of said shaft arms 89, Fig. 3, are secured, which at their upper ends support a trunnion 90 for guiding a link 91 having a spring 92 at its forward end and a stub collar 90' behind the trunnion, the rear end of the link 91 being connected to an adjacent lever 93 on a beam 7 and cooperating with the usual notched quadrant 94 for vertically adjusting wheels 88. Being thus yieldingly mounted in relation to the lister frame, the truck wheels 88 are freely self-adjustable to follow ground irregularities and strain between the truck and frame will be relieved, so that the truck will maintain the plows 8 centered when splitting ridges, and drifting of the implement when listing hillside ridges will be avoided.

A lister planter is commonly employed for simultaneously breaking or splitting the ridges produced by fall plowing and planting and covering the deposited seed, the implement being drawn through the field usually by a tractor, and while thus travelling the carrying wheel 23 rotates the sprockets 62, 73, through their connection by the chain 22, the plows 8 having been set to penetrate the land at the desired depth by adjustment of the levers 43. As the operator is transporting the implement to the field, or when turning corners at the ends of rows, the plows and associated parts have been positioned clear of the land as indicated in Fig. 8, the cam 51 and associated parts occupying the relation shown in Fig. 11, which positioning has caused the lever 68' of the clutch throwout 68 to be pulled forwardly so that the cam teeth 69 ride upwardly on cam teeth 69' of bearing 70, which action forces the throwout member against flange 67 and consequently urges sleeve 66 against pressure of spring 75, thus causing clutch teeth 67' of the sleeve to be disengaged from similar teeth of sprocket 73, which permits the latter sprocket to rotate without imparting rotation to sprocket 72, as will be understood. It will be noted, Fig. 8, that crank 34 of clutch shaft 33 is in upward position and is so held by roller 49 engaging a recess 49' in clutch plate 50.

When about to begin operation, the levers 43 are adjusted to position the plows in the required depth penetration, and as the equipment is moving the operator slightly pulls the ropes 26, 28, which force actuates linkages 25 and 27 to move the rollers 49 from the recesses 49' and beyond the path of the end of finger 52, causing spring 56' to pull on link 56, this action permitting the clutch roller 57 to engage one of the notches 58 within the clutch drum 60, indicated in faint lines in Fig. 9. This operation locks the hub 61, to which the drive wheel 23 is attached, to the shaft 33 and causes it to turn therewith approximately one-half revolution, or until recesses 50' move toward roller 59, which intercepts finger 53 and disengages roller 57 from clutch notches 58 and locks clutch plate 50 until the ropes are again pulled. As the shaft 33 is rotating the vertically movable parts of the implement with the plows are gradually lowered until the plows reach the proper depth, for example, as shown in Fig. 2. During this action it will be understood that the arm 34 is moving in a downward position. As the plows 8 with other devices are gradually lowered by rotation of shaft 33 the cam 51 and parts associated therewith assume the position shown in Fig. 12, causing arm 77 to push on link 76, when the throwout 68 through its cam action against bearing 70 will engage the teeth 67' of said bearing with the sprocket 73 and thereby rotate sprocket 72 which drives the seeder shaft 20 through chain 21. It will be understood that the plows may be adjusted to any depth desired without necessitating the adjustment of the linkage or any other parts of the clutch just referred to. As the implement reaches the end of a row the operator again pulls on ropes 26, 28, when the intermittent clutches become locked to the carrying wheels, and the tools are elevated from the ground, while the seeder shaft drive mechanism is declutched from the main drive shaft in the manner described and so maintained until it is again desired to lower the tools into working position.

With machines commonly employed difficulty is frequently experienced when traveling over rough or furrowed fields by the loss of traction surface for the main drive wheel, as 23, causing cessation of operation of the seeder mechanism at intervals, with the result that unseeded spots are left in the field, and in very rough fields such lack of seed deposit is highly objectionable because of the frequency of such spots. It will be understood that as the implement travels across a field the depth of plow penetration is determined by the carrying wheels, and, for example, should wheel, as 23, enter an abrupt depression the near plow 8 penetrating the ground would carry the entire weight of that side of the implement, as such wheel, forming part of implements well known, would be suspended while the plow must dig into the ground until the wheel again contacts therewith to obtain traction, such wheel being nonrotatable when in suspension, and which renders the seeding mechanism inoperable. In existing implements a link, as 37, has been attached to an adjusting shaft 40 in such manner that the wheel, as 23, could not be moved vertically without adjustment of said shaft. In our improved construction when the implement is in transport or operating in a field the wheel 23 carries the entire weight of its side of the implement, which causes the end 39 of bell-crank 40 to be positioned in the lower end of slot 38 as shown in Fig. 5. As the implement travels, with the plows in operating position, and wheel 23 passes into a depression, indicated in Fig. 6, the slotted connection of the links 36, 37, with bell-crank 40 permits the wheel 23 to closely follow the contour of such depression without prevention by the plows or implements or frame thereof, in which manner the wheel is in constant traction for the purpose mentioned, and, it will be understood, that a slotted link as 36—37 is only used with the master wheel, as 23, which actuates the seeder mechanism drive shaft.

It is also common in implements of the character disclosed to employ disks 14 for covering the deposited seeds, which disks are usually urged into the ground by a desired spring arrangement for controlling the disks to follow ground irregularities, but in some conditions it is desirable to fixedly lock the disks so that they will be positively positioned, which we accomplish by providing a series of holes 9' in bracket 9, adapted to register with a hole 12' in the supporting arm 12, through one of which holes a bolt or pin may be inserted to securely lock the covering disks in predetermined position.

We claim as our invention:

1. In an implement of the class described having a frame, the combination, with the frame, of a crank-axle pivotally connected to the frame, a clutch on the axle including a sprocket, a shaft in the clutch, a drive wheel on the outer end of and rotatable with the clutch, an arm on the inner end of the shaft, a slotted link connected to the arm, a bell-crank mounted on the frame and connected to the link in sliding relation to the latter, and a lever connected to the bell-crank for actuating the latter and the link whereby the drive wheel may sink into depressions and rotate therethrough.

2. In an implement of the class described having a frame, the combination, with the frame, of a crank-axle pivotally connected to the frame, an intermittent clutch secured to the axle, a shaft in the clutch terminating at its outer end in a wheel support and at its inner end in a crank-arm, a lever having an arm extending into the clutch, a sprocket on the clutch, seed driving mechanism supported on the implement including a clutch, a throw-out for the latter clutch having an arm, sprockets associated with the clutch of said mechanism, a drive chain connecting the first mentioned sprocket with one of said sprockets forming part of the seed driving mechanism, a seeder shaft connected to and driven by one of the clutch sprockets of the seed driving mechanism, a link connecting the clutch throw-out and said lever, a bell-crank mounted on the frame, self-adjusting means connecting the crank-arm to the bell-crank, and a lever connected to the bell-crank for controlling the latter.

3. In an implement of the class described having a frame, beams secured to the frame and having plows thereon, seeding mechanism including a clutch secured to the frame, means for vertically adjusting the frame to position the plows and seeding mechanism in relation to the earth, an axle pivotally mounted on the frame, an intermittent clutch supported by the axle, a shaft in the clutch terminating at its outer end in a wheel support, a wheel on the support, means connecting the latter clutch to the clutch of the seeding mechanism for driving the latter, a linkage system on the implement frame connected to the intermittent clutch, and means for actuating the linkage to engage and disengage the latter clutch for controlling the operation of the seeding mechanism.

4. In an implement of the class described, a frame, beams supported by the frame and having plows thereon, an axle, a clutch secured to the axle, a shaft in the clutch including wheel-supporting means at its outer end and a crank-arm at its inner end, means connecting the crank-arm to the frame, a linkage system connecting the clutch to the frame, means for actuating the linkage to disengage the clutch whereby its shaft and crank-arm will rock to vertically adjust the frame and parts carried thereby, seeding mechanism on the frame having a driven shaft and a driving shaft for the latter, said driving shaft embodying a clutch, means for drivingly connecting the intermittent clutch to the clutch on said driving shaft, and means engaging said clutches for declutching the clutch on said driving shaft when the plows are removed from earth engagement whereby the seeding mechanism is rendered inoperative.

5. In an implement of the class described including plowing means, seed dropping means and a frame, a crank-axle pivotally connected to the frame, an intermittent clutch mounted on the axle and having a shaft, a drive wheel on the outer end of the shaft, a crank-arm on the inner end of the shaft, a vertically adjustable link connected to the crank-arm, a sprocket on the clutch, seeding mechanism on the frame embodying a clutch, means connecting the sprocket to the seeding means for actuating the latter, and means connected to the intermittent clutch and to the clutch of the seeding means for resuming actuation of the latter when the plows are adjusted into the ground.

SIMEON B. HENDRICKS.
JOHN M. MARKEL.